United States Patent
Lin

(10) Patent No.: US 6,353,961 B1
(45) Date of Patent: Mar. 12, 2002

(54) AUTOMOBILE LUMINOUS WINDSHIELD WIPER

(76) Inventor: Yung-Fa Lin, 6F, No. 2, Lane 163, Hsin I Rd., Panchiao City, Taipei Hsien (TW)

( * ) Notice: Subject to any disclaimer, the term of this patent is extended or adjusted under 35 U.S.C. 154(b) by 0 days.

(21) Appl. No.: 09/951,970

(22) Filed: Sep. 14, 2001

(51) Int. Cl.⁷ .................................................. B60S 1/04
(52) U.S. Cl. ........................ 15/250.001; 15/250.351; 340/368; 340/471
(58) Field of Search .................. 15/250.001, 257.01, 15/250.351, 250.352; 340/468, 469, 471, 472, 473

(56) References Cited

U.S. PATENT DOCUMENTS

| | | | |
|---|---|---|---|
| 2,650,355 A | * 8/1953 | Pieczonka | 15/250.001 |
| 5,276,937 A | * 1/1994 | Lan | 15/250.001 |
| 5,305,190 A | * 4/1994 | Clement | 15/250.001 |
| 5,867,094 A | * 2/1999 | Tonne | 15/250.001 |

FOREIGN PATENT DOCUMENTS

JP        0223052   *  9/1989   ............ 15/250.001

* cited by examiner

Primary Examiner—Gary K. Graham
(74) Attorney, Agent, or Firm—Rabin & Berdo, P.C.

(57) ABSTRACT

An automobile luminous windshield wiper comprising a windshield wiper with a luminous body; the luminous body consists of a clamp and a base, an illuminator is inside of the base. A dynamic curve stripe light is generated when the windshield wiper is turned on to remind the drivers of opposite direction.

11 Claims, 4 Drawing Sheets

AUTOMOBILE LUMINOUS WINDSHIELD WIPER

BACKGROUND OF THE INVENTION

I. Field of the Invention

This invention relates generally to an automobile luminous windshield wiper and, more specifically, to an automobile luminous windshield wiper that when it is turned on it can generate dynamic curve stripe light to alert drivers traveling in the opposite direction, such mechanism can reduce the traffic accidents.

II. Description of the Prior Art

Heretofore, it is known that most people will not turn on their headlamps while driving under glimmery light for they think they still can see clearly. However, with such dimness, people are not aware of the cars coming from the opposite direction, so that accidents tend to happen easier.

When driving under foggy conditions, it is even more difficult to see clearly, because the fog will reflect the light from headlamps that makes the driver even more difficult to see. The yellow fog lamps can improve the condition to alert the drivers traveling in the opposite direction, however the yellow fog lamps move with the car, so that the alerting effect is not so obvious.

Driving under rainy condition, drivers have to turn on windshield wipers to wipe the water away for better vision. However, this only provides a better vision for the driver who is driving this car, and no reminding effect is provided for the opposite side drivers.

SUMMARY OF THE INVENTION

It is therefore a primary object of the invention to provide an automobile luminous windshield wiper that can generate a dynamic curve stripe light to remind the drivers of opposite direction, such mechanism can reduce the traffic accidents.

In order to achieve the objective set forth, an automobile luminous windshield wiper in accordance with the present invention comprises a windshield wiper with a luminous body; the luminous body includes a clamp and a base, an illuminator is inside of the base. A curve stripe light is generated when the windshield wiper is turned on to remind the drivers of opposite direction.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
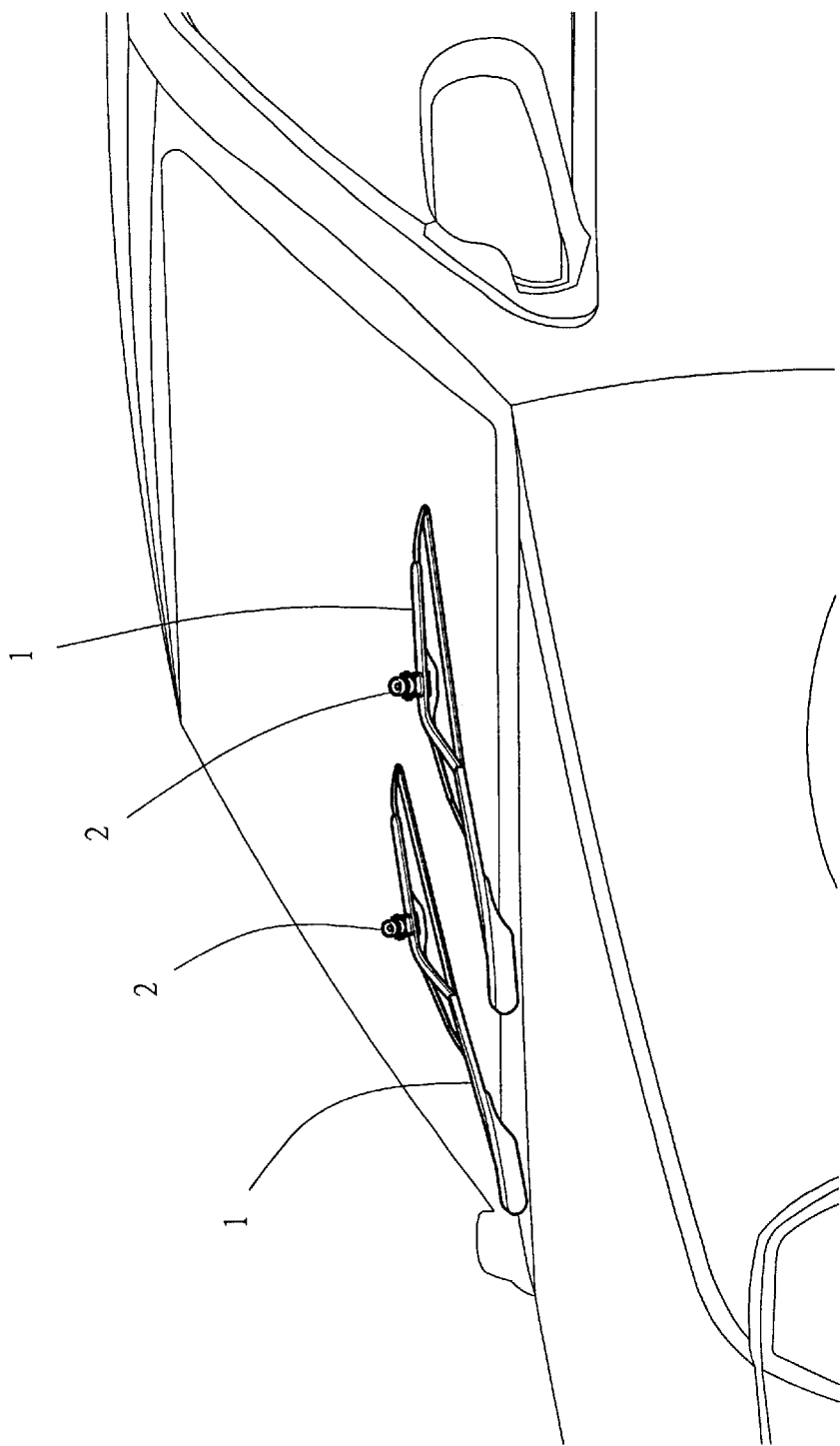
FIG. 1 is a perspective view of an embodiment of the present invention.
Figure 2:
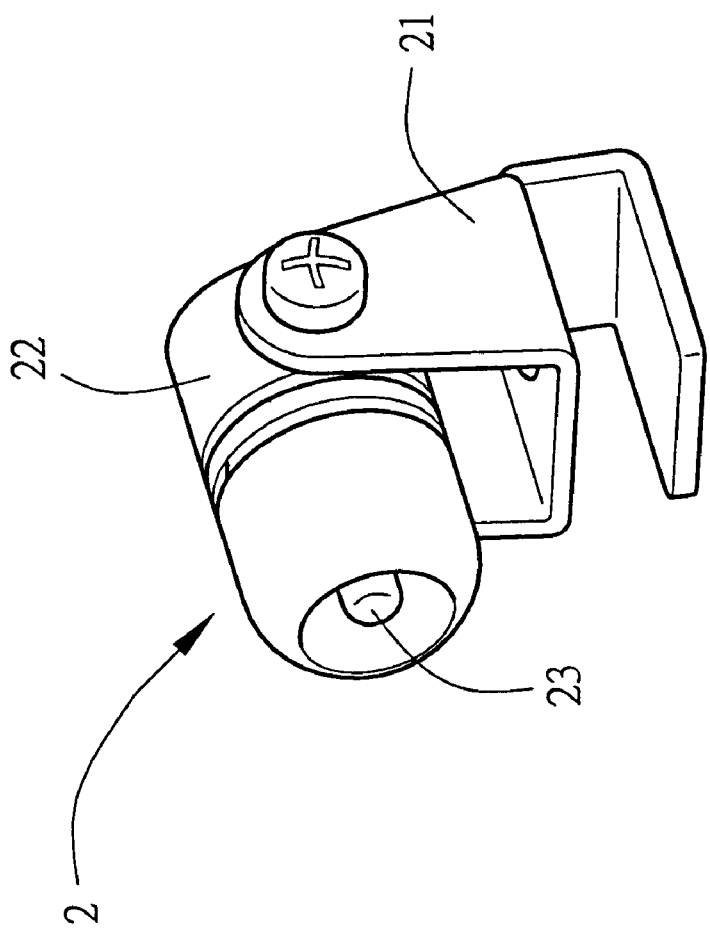
FIG. 2 is a perspective view of the present invention.
Figure 3:
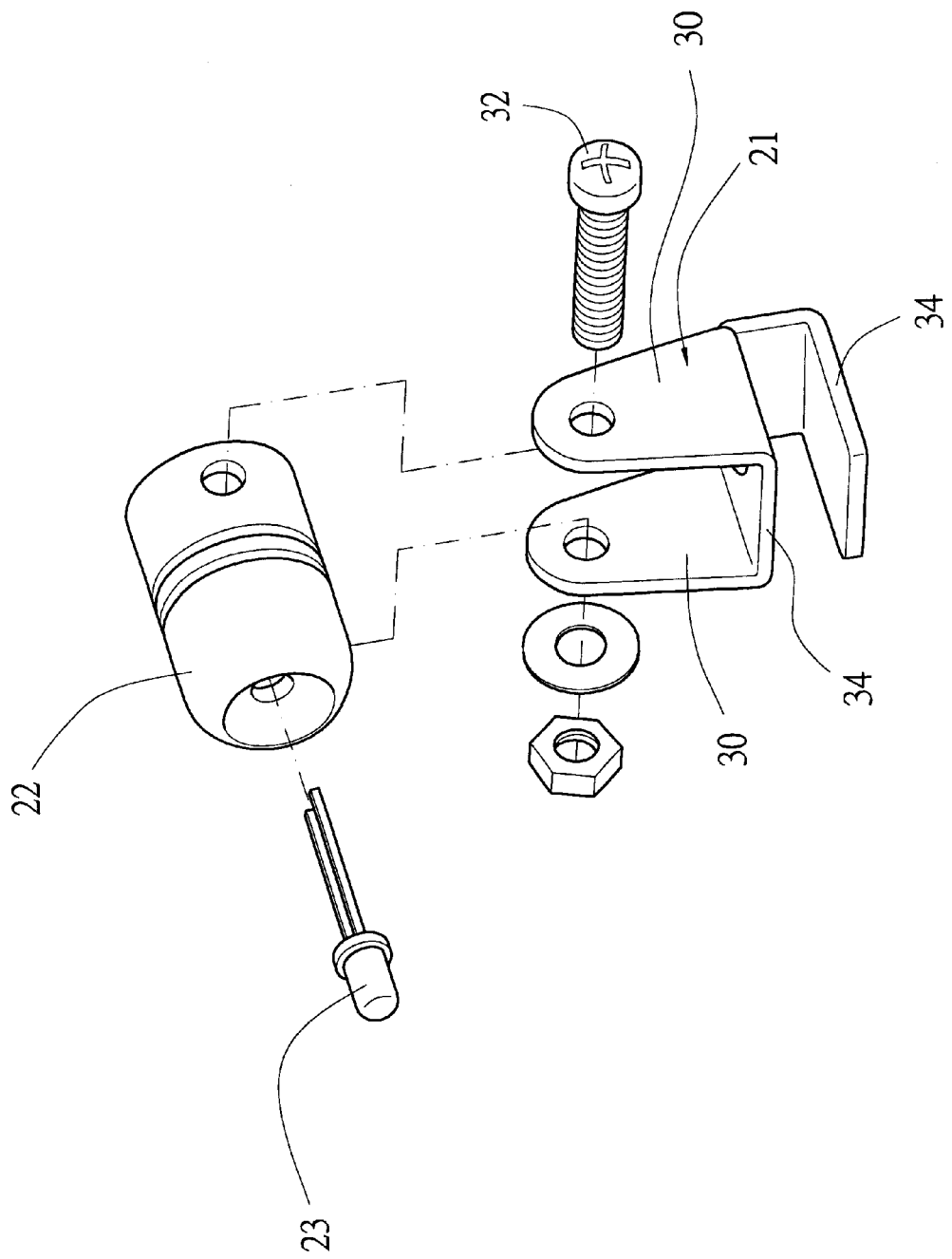
FIG. 3 is an assembly view of the present invention.
Figure 4:
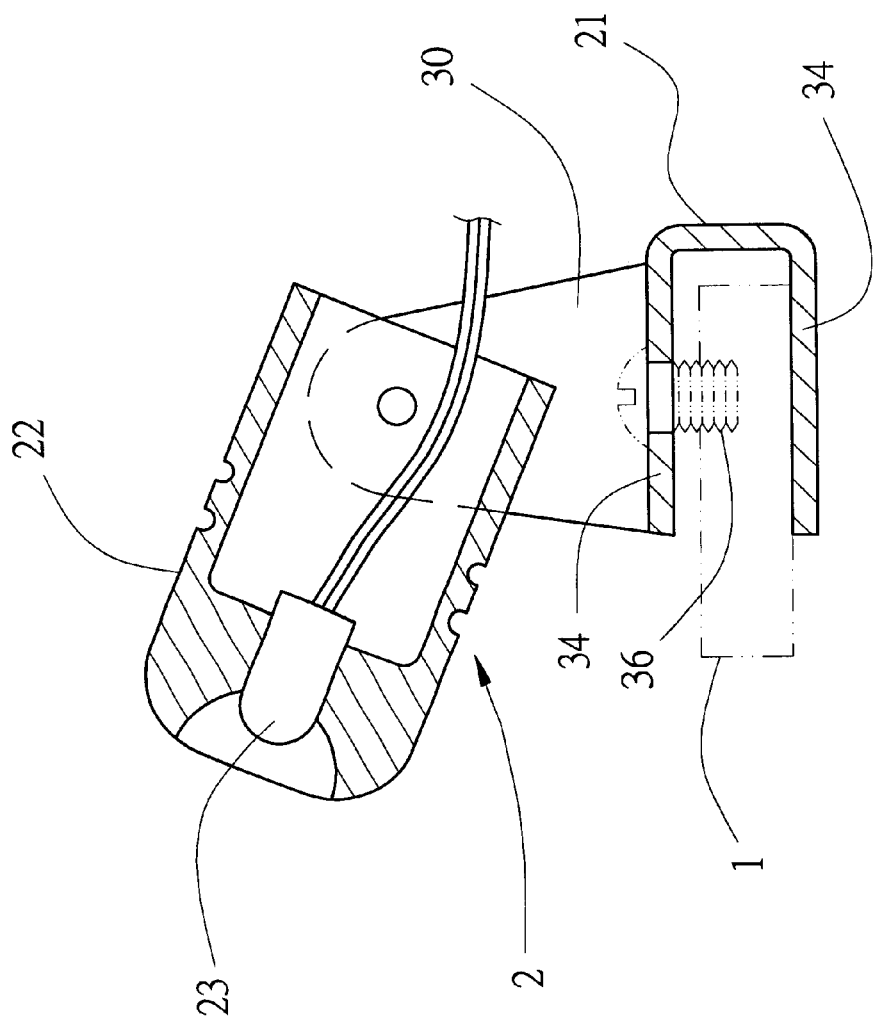
FIG. 4 is a cross-sectional view of the present invention.

Referring to FIG. 1, FIG. 2 and FIG. 3 the present invention is composed of a windshield wiper 1 with a luminous body 2; the luminous body 2 includes a clamp 21 and a base 22 pivotally mounted to the clamp, an illuminator 23 is inside of the base 22. Referring to FIG. 4, a curve stripe light is generated when the windshield wiper 1 is turned on to remind the drivers of opposite direction.

As best shown in FIG. 3, the clamp 21 has two spaced-apart arms 30. The base 22 is disposed in the space between the arms, and is pivotally attached to the arms. Further, each arm 30 and the base 22 has a through hole formed therein. The through hole in each of the arms 30, and the through hole in the base 22 are in alignment. A fastening member 32 passes through the through hole in each of the arms, and through the through hole in the base to pivotally attach the clamp to the arms.

The clamp 21 further has first and second legs 34 defining a U-shaped cross-sectional profile. The arms 30 are attached to the first leg 34. As best shown in FIG. 4, the windshield wiper 1 is receivable between the legs 34. A fastener 36 extends through one of the legs 34 and abuts against the windshield wiper 1 when the windshield wiper is received between the legs. The fastener 36 holds the windshield wiper 1 against another one of the legs 34 when the windshield wiper is received between the legs.

Based on above structure, while driving under foggy or rainy days, the windshield wiper 1 is turned on and swinging, the illuminator 23 of the luminous body 2 can generate dynamic curve stripe light to remind the drivers of the opposite direction, this can offer a better warning effect.

The illuminator can be a high luminous LED (Light Emit Diode) or a DC light bulb based on requirement, this is an application example of the present invention.

While a preferred embodiment of the invention has been shown and described in detail, it will be readily understood and appreciated that numerous omissions, changes and additions may be made without departing from the spirit and scope of the invention.

What is claimed is:

1. An automobile luminous windshield wiper, comprising:
   a windshield wiper; and
   a luminous body including:
      a clamp adapted to be removably attached to said windshield wiper;
      a base pivotally mounted to said clamp; and
      an illuminator located inside of said base.

2. The automobile luminous windshield wiper recited in claim 1, wherein said illuminator is a luminous LED.

3. The automobile luminous windshield wiper recited in claim 1, wherein said illuminator is a DC bulb.

4. The automobile luminous windshield wiper recited in claim 1, wherein said clamp has two legs defining a U-shaped cross-sectional profile, said windshield wiper being receivable between said legs.

5. The automobile luminous windshield wiper recited in claim 4, wherein said clamp further comprises a fastener that extends through one of said legs and abuts against said windshield wiper when said windshield wiper is received between said legs.

6. The automobile luminous windshield wiper recited in claim 5, wherein said fastener holds said windshield wiper against another one of said legs when said windshield wiper is received between said legs.

7. The automobile luminous windshield wiper recited in claim 1, wherein said clamp has two spaced-apart arms, said base being disposed in the space between said arms, and being pivotally attached to said arms.

8. The automobile luminous windshield wiper recited in claim 7, wherein each said arm and said base has a through hole formed therein, the through hole in each of said arms, and the through hole in said base being in alignment; further comprising a fastening member that passes through the through hole in each of said arms, and through the through hole in said base to pivotally attach said clamp to said arms.

9. The automobile luminous windshield wiper recited in claim 8, wherein said clamp further has first and second legs defining a U-shaped cross-sectional profile, said arms being attached to the first leg, said windshield wiper being receivable between said legs.

10. The automobile luminous windshield wiper recited in claim 9, wherein said clamp further comprises a fastener that extends through one of said legs and abuts against said windshield wiper when said windshield wiper is received between said legs.

11. The automobile luminous windshield wiper recited in claim 10, wherein said fastener holds said windshield wiper against another one of said legs when said windshield wiper is received between said legs.

* * * * *